United States Patent
Satake (12)

(10) Patent No.: US 10,052,892 B2
(45) Date of Patent: Aug. 21, 2018

(54) PRINTING DEVICE, AND CONTROL METHOD OF A PRINTING DEVICE

(71) Applicant: SEIKO EPSON CORPORATION, Tokyo (JP)

(72) Inventor: Eiji Satake, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/629,465

(22) Filed: Jun. 21, 2017

(65) Prior Publication Data
US 2017/0368853 A1   Dec. 28, 2017

(30) Foreign Application Priority Data

Jun. 22, 2016 (JP) .................................. 2016-123300

(51) Int. Cl.
| | |
|---|---|
| *B41J 23/00* | (2006.01) |
| *H01M 10/0525* | (2010.01) |
| *B41J 2/32* | (2006.01) |
| *H01M 10/44* | (2006.01) |
| *H01M 10/48* | (2006.01) |
| *H02J 7/02* | (2016.01) |

(52) U.S. Cl.
CPC ............. *B41J 23/00* (2013.01); *B41J 2/32* (2013.01); *H01M 10/0525* (2013.01); *H01M 10/44* (2013.01); *H01M 10/48* (2013.01); *H02J 7/02* (2013.01)

(58) Field of Classification Search
CPC ........ B41J 23/00; B41J 2/32; H01M 10/0525; H01M 10/44; H01M 10/48
See application file for complete search history.

(56) References Cited

U.S. PATENT DOCUMENTS

| | | | | |
|---|---|---|---|---|
| 6,643,566 B1* | 11/2003 | Lehr | ....................... | G06F 1/26 700/286 |
| 8,266,460 B2* | 9/2012 | Diab | ....................... | G06F 1/266 713/300 |
| 2015/0264208 A1 | 9/2015 | Achiwa et al. | | |

FOREIGN PATENT DOCUMENTS

| | | |
|---|---|---|
| JP | 2006-094376 A | 4/2006 |
| JP | 2015-174377 A | 3/2014 |
| JP | 2015-174375 A | 10/2015 |
| JP | 2015-176442 A | 10/2015 |

* cited by examiner

*Primary Examiner* — Lamson Nguyen
(74) *Attorney, Agent, or Firm* — Foley & Lardner LLP (57) ABSTRACT

Power required for a printing operation can be supplied while supplying power to a connected external device. A printer 1 connects to a smart device 2, and has: a power circuit 14; a USB interface 15 capable of supplying power to the smart device while communicating by wire with the smart device 2; a print unit 16 that prints; and a controller 11 that controls the print unit 16 to print in a power conservation mode when information instructing printing by the print unit 16 is received by the interface 15 from the smart device 2 while supplying power from the power circuit 14 to the smart device 2.

14 Claims, 3 Drawing Sheets

PRINTING DEVICE, AND CONTROL METHOD OF A PRINTING DEVICE

This application claims priority under 35 U.S.C. § 119 to Japanese Patent Application No. 2016-123300 filed on Jun. 22, 2016, the entire disclosure of which is expressly incorporated by reference herein.

BACKGROUND

1. Technical Field

The present invention relates to a printing device, and a control method of a printing device.

2. Related Art

Devices that control the supply of power to a connected external device are known from the literature. See, for example, JP-A-2015-176442.

JP-A-2015-176442 describes an image processing device configured to report, to a connected peripheral device, when a state of the image processing device changes, combinations of the voltage and current of the power that can be supplied to the connected peripheral device, and if the voltage and current combination required by the peripheral device is included in the reported combinations, supply power of the voltage and current the peripheral device requires.

When an external device is connected as described in JP-A-2015-176442, however, the printing device supplies power to the connected external device based on power supplied from a power supply such as an AC adapter. When the printing device executes the printing operation while supplying power to a connected external device, supplying the power required for the printing operation may not be possible. This can adversely affect the printing operation.

SUMMARY

An objective of the present invention is to enable supplying the power required by the printing operation of the printing device while supplying power to a connected external device.

To achieve the foregoing objective, a printing device according to the invention includes: a power supply unit; an interface capable of supplying power from the power supply unit to an external device while communicating by wire with the external device; a print unit configured to print; and a controller configured to control the print unit to print in a power conservation mode when information instructing printing by the print unit is received by the interface from the external device while supplying power from the power supply unit to the external device.

When information instructing printing is received, this configuration suppresses the power consumption of the printing operation by printing in a power conservation mode, and can supply the power required for the printing operation while supplying power to a connected external device.

In a printing device according to another aspect of the invention, the print unit includes a printhead with multiple resistors; and the controller, in the power conservation mode, segments the plural resistors of the printhead into plural blocks, and prints by energizing the resistors in the segmented blocks one block at a time.

This configuration prints in the power conservation mode by energizing the resistors in each block one block at a time, and can therefore suppress power consumption by the printing operation compared with a configuration that does not divide the multiple resistors in multiple blocks.

In a printing device according to another aspect of the invention, the controller monitors the state-of-charge of a battery in the external device, and controls the number of segmented blocks according to the detected state-of-charge.

This configuration changes the number of blocks that are formed according to the state-of-charge of the battery, and can therefore suppress the power consumption of the printing operation according to the state-of-charge of the battery.

In a printing device according to another aspect of the invention, the controller, when the state-of-charge is below a specific value, increases the number of blocks created so that the state-of-charge goes above a specific value.

This configuration increases the number of blocks that are formed when the state-of-charge is below a specific value, and can therefore suppress power consumption by the printing operation more than when the state-of-charge exceeds the specific value.

In a printing device according to another aspect of the invention, when the detected state-of-charge exceeds a specific value, the controller receives power supplied from the external device by the power supply unit.

Because this configuration can receive power from an external device, the printing device can operate using the received power.

In a printing device according to another aspect of the invention, the controller monitors the time the external device is connected to the interface, and when the time connected exceeds a specific value, supplies power by the power supply unit so that the state-of-charge is within a specific range.

When the detected connection time exceeds a specific length of time, this configuration controls the supply of power so that the state-of-charge goes within a specific range, and can therefore supply power without applying a load to the battery of the external device.

In a printing device according to another aspect of the invention, the power supply unit supplies power for charging a battery of the external device.

This configuration enables supplying the power required for the printing operation while charging the battery of the external device.

To achieve the foregoing objective, another aspect of the invention is a control method of a printing device having a power supply unit, an interface capable of supplying power from the power supply unit to an external device while communicating by wire with the external device, and a print unit configured to print, the control method including: controlling the print unit to print in a power conservation mode when information instructing printing by the print unit is received by the interface from the external device while supplying power from the power supply unit to the external device.

When information instructing printing is received, this configuration suppresses the power consumption of the printing operation by printing in a power conservation mode, and can supply the power required for the printing operation while supplying power to a connected external device.

Other objects and attainments together with a fuller understanding of the invention will become apparent and

DESCRIPTION OF EMBODIMENTS

Figure 1:
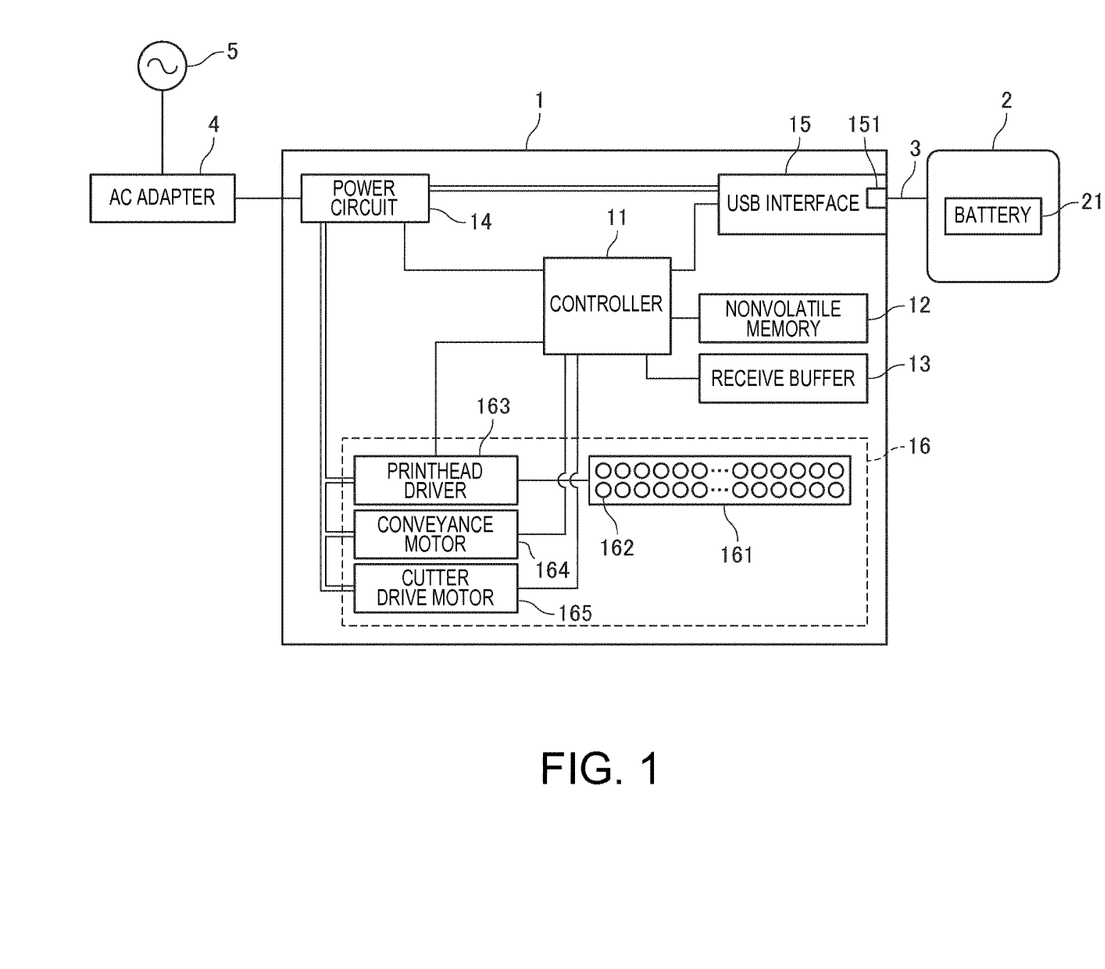
FIG. 1 illustrates the configuration of a printer.

FIG. 1 is a block diagram illustrating the configuration of a printer 1 (printing device).

The printer 1 is a device that prints text and images, for example, on recording media based on data input from a connected external device. In this embodiment of the invention, the printer 1 connects to a smart device 2 (external device), and based on data input from the smart device 2 prints text, images or other content on recording media. The printer 1 internally stores thermal roll paper (not shown in the figure) as the recording medium, and prints text and images by applying heat to the recording surface of the thermal roll paper by means of a thermal line head 161 (printhead) having multiple resistors 162 as heat elements.

The printer 1 operates using power supplied from an AC adapter 4 that connects to a commercial power source 5.

The smart device 2 is a smartphone, tablet, or other mobile terminal that can be easily carried around by the user. As shown in FIG. 1, the smart device 2 connects to the printer 1 through a USB (Universal Serial Bus) cable 3. In this embodiment of the invention, the smart device 2 connects to the printer 1 through a USB cable 3 compatible with the USB-PD (USB-Power Delivery) standard.

The USB-PD standard enables supplying a maximum 100 W of power. The USB-PD standard defines a role swap function that changes the relationship between the host and connected device for both power delivery and data communication. For example, for power delivery, the role swap function of the USB-PD standard enables changing which device supplies power and which device receives power. In other words, in this embodiment, the USB-PD standard enables supplying power from the smart device 2 to the printer 1, or supplying power from the printer 1 to the smart device 2.

For example, the smart device 2 functions as the host when print data is sent from the smart device 2 to the printer 1, and the printer functions as the host when power is supplied from the printer to the smart device.

Because previous standards do not have a role swap function, the smart device 2 and the printer 1 could not both function as hosts. In other words, because the smart device 2 is the host when print data is sent from the smart device 2 to the printer 1, the printer 1 was unable to supply power to the smart device 2. However, by using the role swap function of the USB-PD standard, the smart device 2 can send commands including print data to the printer 1 while the smart device 2 receives power supplied from the printer 1.

Returning to the smart device 2, as shown in FIG. 1, the smart device 2 has a battery 21, and operates using power stored in the battery 21. The battery 21 of the smart device 2 in this example is a lithium ion battery or other type of storage battery. The smart device 2 can charge the battery 21 with power supplied from the USB interface 15.

Triggered by a user command, for example, the smart device 2 can send printing-related commands (information instructing printing) to the printer 1. In this example, the smart device 2 sends printing-related commands through the USB cable 3. When a command is sent from the smart device 2, the printer 1 stores the command in a receive buffer 13. Examples of printing-related commands include commands instructing printing, commands instructing a line feed, and commands instructing cutting the recording medium. More specifically, the printing-related commands are commands that instruct driving a thermal line head 161, conveyance motor 164, and cutter drive motor 165 described below.

To cause the printer 1 to print, the smart device 2 generates print data including the text, images, or other content the printer 1 is to print when triggered by a user command, for example. The smart device 2 then sends commands including the generated print data according to the USB-PD standard to the printer 1. The printer 1 then executes the commands and prints the text and images on the recording medium based on the print data.

The AC adapter 4 is connected to a commercial power source 5 through a cable, rectifies, smoothes, and voltage converts the power supplied from the 100-VAC commercial power source 5, for example, and supplies 24-VDC power to the printer 1 through a cable. The AC adapter 4 is configured to disconnectably connect with the printer 1 through the connector.

As shown in FIG. 1, the printer 1 has a controller 11, nonvolatile memory 12, receive buffer 13, power circuit 14 (power supply unit), USB interface 15 (interface), and print unit 16.

The controller 11 has a CPU (central processing unit), ROM (read-only memory), RAM (random access memory), and other peripheral circuits not shown, and controls the printer 1.

The nonvolatile memory 12 is EEPROM (Electrically Erasable Programmable Read-Only Memory), flash memory, or other type of semiconductor memory device, or a hard disk drive or other type of storage medium, and nonvolatilely stores data rewritably.

The receive buffer 13 is a temporary storage device, such as RAM or other type of semiconductor memory device. The receive buffer 13 stores commands received from external devices as controlled by the controller 11. In this example, the receive buffer 13 stores commands received from the smart device 2 by wired communication.

The power circuit 14 connects to an AC adapter 4, and supplies power to other parts of the printer 1 based on the power supplied from the AC adapter 4. The power circuit 14 also supplies power for charging the battery 21 of the smart device 2 through the USB interface 15.

The USB interface 15 includes an interface board with a USB port 151, and other configurations related to USB communication. In this embodiment of the invention, the USB port 151 is configured with a port conforming to the USB Type-C (USB-C) standard. The USB interface 15 communicates with the smart device 2 connected to the USB port 151 through the USB cable 3 as controlled by the controller 11.

The USB port 151 is exposed to the outside of the printer 1, and has power pins (VBUS, GND) and data pins (D+, D−), for example. The USB interface 15 supplies power from the power pins of the USB port 151 to an external device connected through USB cable 3 as controlled by the controller 11. In this example, the smart device 2 connects through the USB cable 3 to the USB port 151. The power circuit 14 also supplies power for charging the battery 21 to the connected smart device 2 through the USB interface 15.

As described above, the USB-PD standard has a role swap function. As a result, the printer 1 in this embodiment can receive power from the smart device 2 as described below.

The USB interface 15 also detects connection of an external device. The detection signal is output to the controller 11.

The print unit 16 receives power supplied from the power circuit 14, and prints based on the print data received from the external device, as controlled by the controller 11. In this example, the print unit 16 prints based on print data received from the smart device 2. The print unit 16 includes a thermal line head 161, printhead driver 163, conveyance motor 164, and cutter drive motor 165.

The thermal line head 161 has numerous resistors 162 arrayed in a line perpendicular to the conveyance direction of the thermal roll paper. The thermal line head 161 prints text and images by energizing resistors 162 to generate and apply heat to the printing surface of the thermal roll paper.

The printhead driver 163 controls energizing resistors 162 of the thermal line head 161 as controlled by the controller 11.

The conveyance motor 164 causes the conveyance rollers (not shown in the figure) to turn and convey the thermal roll paper as controlled by the controller 11.

The cutter drive motor 165, as controlled by the controller 11, drives a movable knife (not shown in the figure) to slide against a fixed knife (not shown in the figure) to cut the thermal roll paper.

The smart device 2 in this example may be used with the printer 1 in a POS (point-of-sale) system. A POS system is a system commonly used in retail sales in shopping centers, department stores, convenience stores, and sales carts on trains, for example, as well as in restaurants, coffee shops, bars, and other food service businesses. A POS system has functions for processing sales transactions appropriately to the product or service purchased by a customer, and printing sales receipts.

A POS system is described below using the example of a POS system used in a restaurant. A smart device 2 is assigned to each waiter, who carries the smart device 2 while moving about the restaurant. When the waiter needs to print a receipt, he operates the smart device 2 to send print data to a printer 1 installed in the restaurant, causing the printer 1 to print based on the print data. As a result, the printer 1 prints a receipt in response to operation of the smart device 2.

Because the user carries the smart device 2 around, the battery of the smart device 2 must be periodically recharged.

In this example, the printer 1 supplies power to the connected smart device 2 through the USB interface 15. The smart device 2 receives the power supply and charges the battery 21.

As described above, when the smart device 2 connects through a USB cable 3 compatible with the USB-PD standard, the printer 1 can print based on printing-related commands received from the smart device 2 while supplying charging power to the smart device 2. However, when the printer 1 while supplying power to the connected smart device 2, the power required by the printer 1 may exceed the capacity of the AC adapter 4 depending upon the power required by the print unit 16 to print. More specifically, when printing while supplying power to the smart device 2, the sum of the power supplied to the smart device 2 and the power supplied to the print unit 16 may exceed the capacity of the AC adapter 4, depending on the power required by the print unit 16. In this event, the printer 1 may not be able to supply sufficient power to the print unit 16. This may lead to the print unit 16 becoming unable to execute the printing operation. More particularly, when the printer 1 is used in a POS system as in this example and the printer 1 prints receipts by printing on thermal roll paper, the printer 1 may not be able to supply the power required by the print unit 16, and the process of producing receipts may be affected.

The printer 1 according to this embodiment therefore operates as described below.

Figure 2:
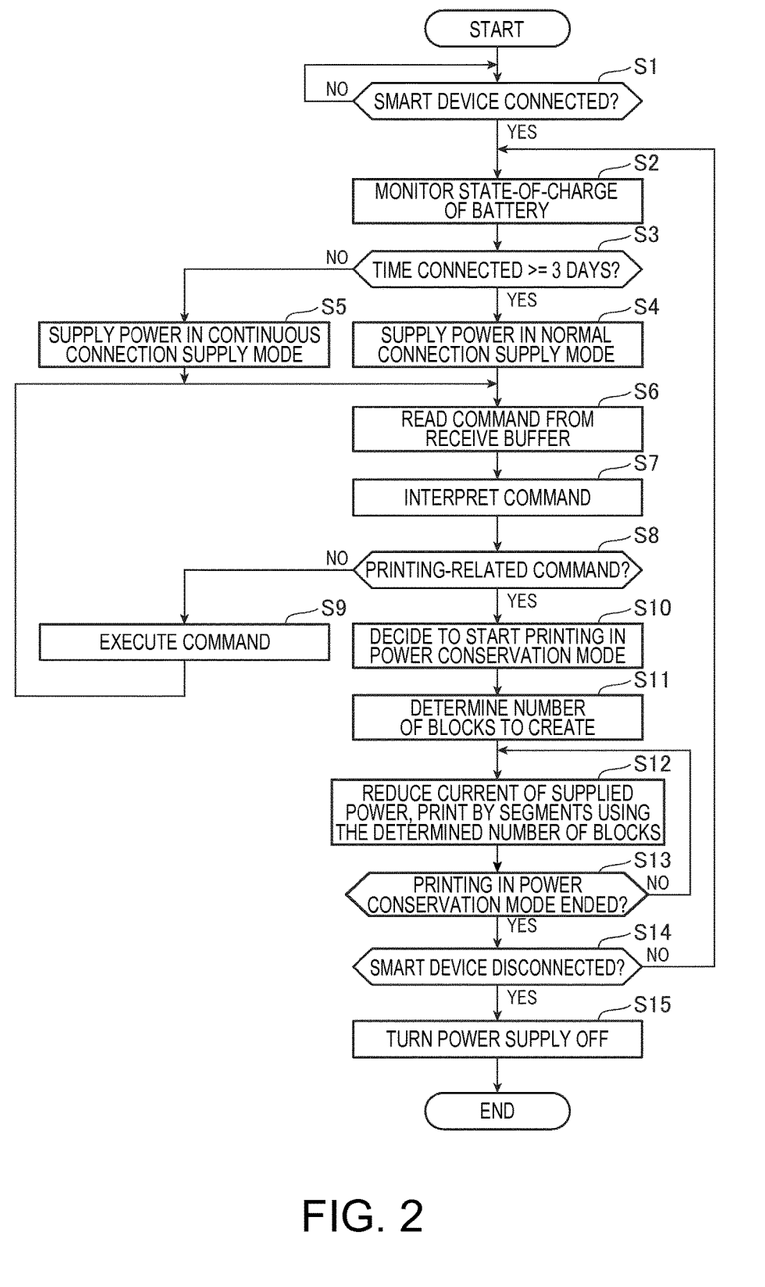
FIG. 2 is a flow chart of printer operation.

FIG. 2 is a flow chart of the operation of the printer 1 according to this embodiment.

The controller 11 of the printer 1, based on the detection signal output from the USB interface 15, determines whether or not a smart device 2 is connected (step S1). If connection of a smart device 2 is detected (step S1: YES), the controller 11 monitors the state-of-charge of the battery 21 of the smart device 2 (step S2). The state-of-charge represents the charge stored in the battery 21 relative to the total storage capacity of the battery 21. For example, if the state-of-charge is 10%, the battery 21 is charged to 10% of the total storage (charge) capacity of the battery 21. The controller 11 acquires the voltage of the battery 21 through the USB interface 15, for example, and based on the acquired voltage, monitors the state-of-charge of the battery 21. Note that any desirable method may be used to monitor the state-of-charge of the battery 21.

Next, the controller 11 determines if the smart device 2 has been connected for three days or longer (step S3). For example, the controller 11 keeps the current time, and when the connection detection signal from the USB interface 15 is input, stores in nonvolatile memory 12, for example, information indicating the date and time the smart device 2 was connected. The controller 11 then determines in this step if the present current time is three days or more after the time indicated by the stored date and time.

If the smart device 2 is determined to be connected for three days or more (step S3: NO), the controller 11 supplies power to the smart device 2 in a continuous connection supply mode (step S4).

The continuous connection supply mode is a mode for supplying power to the smart device 2 so that the state-of-charge of the battery 21 remains in a specific range, which in this example is from 80% to 30%.

Because the length of time power is supplied from the printer 1 increase as the length of time the smart device 2 is connected increases, charging the smart device 2 may continue even though the battery 21 is fully charged. In this case, the battery 21 may be overcharged. Overcharging is related to deterioration of the battery 21, and applies a load on the battery 21. The controller 11 therefore prevents overcharging and suppresses battery 21 deterioration by entering a continuous connection supply mode when the smart device 2 has been connected for three days or longer. Because the controller 11 controls supplying power in the continuous connection supply mode so that the state-of-charge of the battery 21 does not go below 30%, the controller 11 prevents the smart device 2 from being unable to operate after the smart device 2 is disconnected.

Referring again to step S3, if the time the smart device 2 is connected is determined to be less than three days (step S3: NO), the controller 11 supplies power to the smart device 2 in a normal connection supply mode (step S5).

The normal connection supply mode is a mode in which power is supplied to fully charge the battery 21, that is, until the state-of-charge is 100%.

The controller 11 thus supplies power in the continuous connection supply mode if the smart device 2 has been connected for three days or more, and supplies power in the normal connection supply mode if the smart device 2 has not been connected for three days or more. The controller 11 can therefore control the state-of-charge of the battery 21 appropriately to how long the smart device 2 has been connected.

Whether the controller 11 starts supplying power in the continuous connection supply mode or the normal connection supply mode, the controller 11 reads from the receive buffer 13 commands received from the smart device 2 (step S6), and interprets the commands that were read (step S7).

Next, the controller 11 determines if the command interpreted in step S7 is a command related to printing (step S8). If the command is not a printing-related command (step S8: NO), the controller 11 executes the command (step S9). For example, if the command that was read is a status request command requesting the status of the printer 1, the controller 11 sends information indicating the status of the printer 1 to the smart device 2.

However, if the command that was read is a printing-related command (step S8: YES), the controller 11 decides to control the print unit 16 and start printing in a power conservation mode (step S10). In this example, the controller 11 executes a segmented printing process when printing in the power conservation mode.

Segmented printing is described next.

Figure 3:
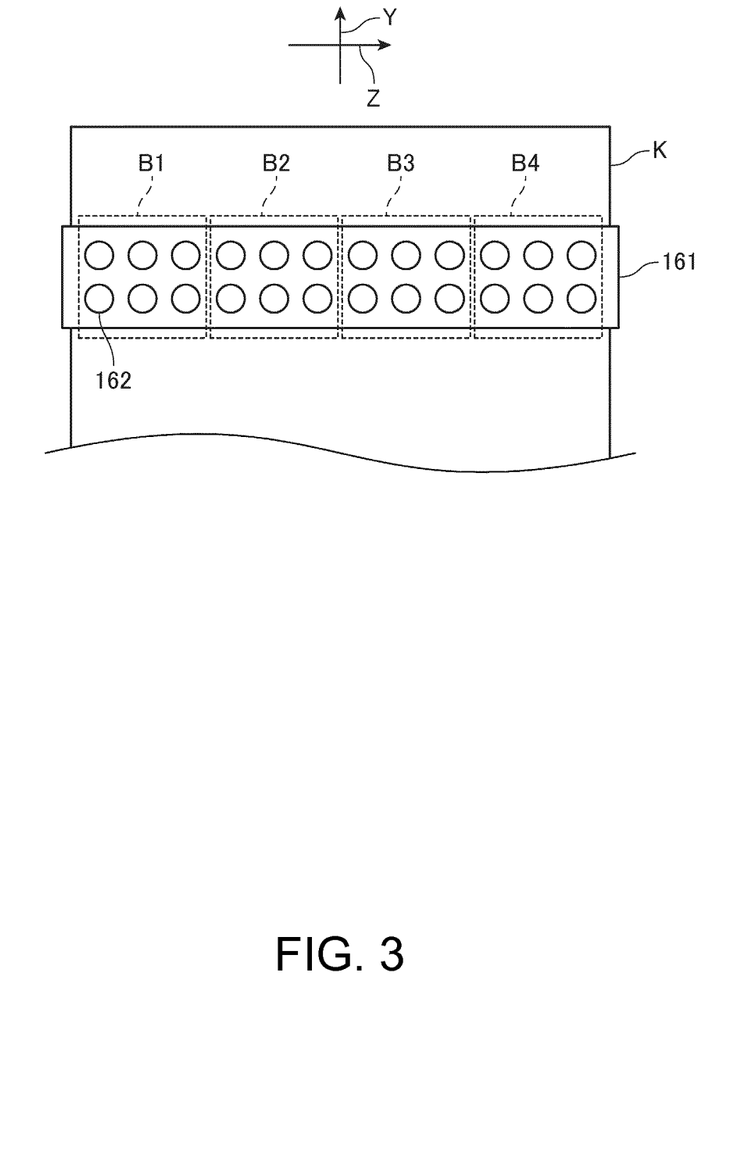
FIG. 3 is used to describe a segmented printing mode.

FIG. 3 is used to describe segmented printing.

FIG. 3 shows an example of a thermal line head 161 having 24 resistors 162 arranged in two rows of 12 resistors 162 each in the direction Z perpendicular to the conveyance direction Y of the thermal roll paper K.

Segmented printing is a method of printing by dividing the many resistors 162 of the thermal line head 161 into plural blocks, and then printing by energizing the resistors 162 in the segmented blocks one block at a time.

In this example, the 24 resistors 162 are grouped into four blocks, referred to below as block B1, block B2, block B3, and block B4, so that each block contains six resistors 162 with three resistors 162 in the direction Z perpendicular to the conveyance direction Y, and two resistors 162 in the conveyance direction Y, as shown in FIG. 3.

When segmented as shown in FIG. 3, the controller 11 controls the printhead driver 163 to energize the resistors 162 in block by block in the order block B1, block B2, block B3, block B4. More specifically, when the 24 resistors 162 are segmented as shown in FIG. 3, the controller 11 controls the printhead driver 163 to energize the six resistors 162 in block B1 first. Next, when energizing block B1 ends, the controller 11 energizes the six resistors 162 in block B2. Next, when energizing block B2 ends, the controller 11 energizes the six resistors 162 in block B3. Next, when energizing block B3 ends, the controller 11 energizes the six resistors 162 in block B4.

During segmented printing, the controller 11 thus controls the printhead driver 163 to print by energizing the resistors 162 in each block one block at a time. Compared with a configuration in which the resistors 162 of the thermal line head 161 are not divided into blocks, the controller 11 can reduce the number of resistors 162 that are simultaneously energized, and thereby suppress power consumption by the thermal line head 161 when printing.

FIG. 3 shows an example in which the 24 resistors 162 of the thermal line head 161 are divided into four blocks, but the power consumption by the thermal line head 161 when printing can be further reduced by segmenting the thermal line head 161 into more than four blocks. For example, the resistors 162 may be segmented into six blocks so that each block contains four resistors 162, two in the conveyance direction Y and two in the perpendicular direction Z. In this configuration, because the number of simultaneously energized resistors 162 is less than when there are only four blocks, segmented printing when using six blocks suppresses power consumption by the thermal line head 161 more than segmented printing with the resistors 162 divided into four blocks.

Referring again to the flow chart in FIG. 2, when the controller 11 determines to start printing in the power conservation mode, it determines the number of blocks into which to group the plural resistors 162 of the thermal line head 161 (step S11). The controller 11 determines the number of blocks based on the state-of-charge of the monitored battery 21.

An example of the process of step S11 is described below.

The process of step S11 described below is an example of one method of determining the number of blocks into which to divide the 24 resistors 162 of the thermal line head 161 shown in FIG. 3.

In this example, the nonvolatile memory 12 stores block segmenting information. The block segmenting information stores plural relational sets of state-of-charge range information indicating a state-of-charge range, and block number information indicating the number of blocks into which the plural resistors 162 of the thermal line head 161 are divided.

More specifically, in this example, the block segmenting information stored by the nonvolatile memory 12 stores information relating state-of-charge range information indicating a state-of-charge range from 100% to 70%, to block number information indicating the number of block segments is 2.

The block segmenting information also includes information relating state-of-charge range information indicating a state-of-charge range from 69% to 40%, to block number information indicating the number of block segments is 3.

The block segmenting information also includes information relating state-of-charge range information indicating a state-of-charge range from 39% to 10%, to block number information indicating the number of block segments is 4.

The block segmenting information also includes information relating state-of-charge range information indicating a state-of-charge range from 9% to 0%, to block number information indicating the number of block segments is 6.

Note that the number indicated by the block number information in this example indicates the number of blocks that are formed based on the number of multiple resistors 162 aligned in the perpendicular direction Z of the thermal line head 161. For example, that the thermal line head 161 in FIG. 3 is divided into two blocks means that the 24 resistors 162 are divided into two blocks so that each (one) block contains a total of twelve resistors 162, two in the conveyance direction Y and six in the perpendicular direction Z.

The controller 11 determines the number of blocks into which to segment the resistors 162 of the thermal line head 161 based on the monitored state-of-charge and the block segmenting information. For example, if the controller 11 determines by monitoring the battery 21 that the state-of-charge is 50%, the controller 11 references the block segmenting information and determines that the number of blocks to form is greater than the number when the state-of-charge exceeds 70% (that is, a specific value), and in this example determines the number of blocks to form is 3.

Similarly, if the controller 11 determines the state-of-charge if the battery 21 is 20%, the controller 11 references the block segmenting information and determines that the number of blocks to form is greater than the number when the state-of-charge exceeds 40% (a specific value), and in this example determines the number of blocks to form is 4.

Similarly, if the controller 11 determines the state-of-charge if the battery 21 is 5%, the controller 11 references the block segmenting information and determines that the number of blocks to form is greater than the number when the state-of-charge exceeds 10% (a specific value), and in this example determines the number of blocks to form is 6.

Referring again to the flow chart in FIG. 2, the controller 11 then controls the power circuit 14 to reduce the power current supplied to the smart device 2, divides the plural resistors 162 of the thermal line head 161 into the number of blocks determined in step S11, and executes the segmented printing process (step S12). Note that other desirable methods may be used to reduce the current supply.

The controller 11 thus monitors the state-of-charge of the battery 21 in the smart device 2, and determines, appropriately to the state-of-charge of the battery 21, the number of blocks into which the plural resistors 162 of the thermal line head 161 are divided. The controller 11 then divides the plural resistors 162 into the selected number of blocks, and executes the segmented printing process. As a result, because the controller 11 can suppress the power consumed by the printing operation appropriately to the state-of-charge of the battery 21 of the smart device 2, the controller 11 can supply to the print unit 16 the power required for the printing operation while continuing to supply power to the smart device 2. Furthermore, because the power required for the printing operation can be supplied to the print unit 16 while supplying power to the smart device 2 when the printer 1 and smart device 2 are used as a POS system, adversely affecting the process of producing receipts can be prevented.

As described above, in the segmented printing process, the controller 11 supplies power to the smart device 2 at a lower current level than the supply current when not executing the segmented printing process. As a result, the controller 11 can prevent the sum of the power supply to the smart device 2 and the power supply to the print unit 16 exceeding the capacity of the AC adapter 4.

More specifically, the controller 11 executes the segmented printing process by increasing the number of blocks into which the plural resistors 162 of the thermal line head 161 are divided as the state-of-charge of the battery 21 decreases. The controller 11 can therefore suppress power consumption related to the printing operation as the state-of-charge of the battery 21 decreases. As a result, the controller 11 can prevent the sum of the power supply to the smart device 2 and the power supply to the print unit 16 exceeding the capacity of the AC adapter 4 even if the current supplied to the smart device 2 increases as the state-of-charge of the battery 21 decreases. In other words, even if the current supply to the smart device is controlled differentially according to the state-of-charge of the battery 21, the sum of the power supply to the smart device 2 and the power supply to the print unit 16 can be prevented from exceeding the capacity of the AC adapter 4 during the segmented printing process.

Referring again to the flow chart in FIG. 2, the controller 11 then determines if printing in the power conservation mode has ended (step S13). Determining if printing in the power conservation mode has ended is based on whether or not the command the controller 11 read from the receive buffer 13 is a command related to the end of printing. An example of a command related to the end of printing is a cut command. If the command read from the receive buffer 13 is a command related to the end of printing, the controller 11 determines to end printing in the power conservation mode (step S13: YES). If the controller 11 determines printing in the power conservation mode has ended, it resets the current level of the power supply to the smart device to the current level before printing.

Next, based on the detection signal from the USB interface 15, the controller 11 determines if the smart device 2 and printer 1 were disconnected (step S14). If not disconnected (step S14: NO), the controller 11 returns to step S2. If disconnected (step S14: YES), the controller 11 turns the power supply to the smart device 2 off (step S15).

Operation of the printer 1 when supplying power from the printer 1 to the smart device 2 is described above. As described above, the USB-PD standard enables changing the supply side and receiving side by means of the role swap function. As a result, when the state-of-charge of the battery 21 of the smart device 2 exceeds 90% (a specific value), for example, the controller 11 may be configured to receive power from the smart device 2.

In this example the printer 1 is a small, portable mobile printer, is powered by a battery, and prints and performs other operations using power supplied from the battery. Because a printer 1 configured in this way is carried and used without being connected to a stationary power source, the battery of the printer 1 must be periodically charged. Because the printer 1 receives power from the smart device 2, the battery of the printer 1 can be charged with the received power.

Because the USB-PD standard enables the power supplier and the power receiver to change, the printer 1 can also receive power from the smart device, and based on the supplied power, can execute operations including charging a battery of the printer 1.

As described above, the printer 1 (printing device) according to this embodiment has a power circuit 14 (power supply unit); a USB interface 15 (interface) enabling wired communication with the smart device 2 while supplying power from the power circuit 14 to the smart device 2; a print unit 16 that prints; and a controller 11 configured to control the print unit 16 to print in a power conservation mode when a command related to printing by the print unit 16 (information instructing printing) is received from the smart device 2 while supplying power from the power circuit 14 to the smart device 2.

When a printing-related command is received, the controller 11 can therefore suppress power consumption by the printing operation by printing in a power conservation mode. The controller 11 can therefore supply the power required for the printing operation while supplying power to a connected smart device 2.

The print unit 16 has a thermal line head 161 (printhead) with multiple resistors 162. In the power conservation mode, the controller 11 divides the multiple resistors 162 of the thermal line head 161 into multiple blocks, and prints by energizing the resistors 162 in each block one block at a time.

Printing in the power conservation mode is thus done by energizing the resistors 162 in each segmented block one block at a time. Compared with a configuration in which the numerous resistors 162 are not divided into plural blocks, the controller 11 can reduce the number of resistors 162 that are energized simultaneously, and can suppress power consumption by the printing operation.

The controller 11 also monitors the state-of-charge of the battery 21 of the smart device 2, and controls the number of blocks that are created according to the detected state-ofcharge. More specifically, the controller 11 increases the number of blocks that are created as the state-of-charge of the battery 21 decreases.

The controller 11 can therefore suppress power consumption related to the printing operation according to the state-of-charge of the battery 21 by changing the number of blocks formed according to the state-of-charge of the battery 21. More particularly, the controller 11 increases the number of blocks into which the plural resistors 162 of the thermal line head 161 are divided as the state-of-charge of the battery 21 decreases, and controls printing by a segmented printing process. As a result, the controller 11 can suppress power consumption related to the printing operation as the state-of-charge of the battery 21 decreases. Therefore, even if the current level of the power supply to the smart device 2 increases as the state-of-charge of the battery 21 decreases, the controller 11 can prevent the sum of the power supply to the print unit 16 and the power supply to the smart device 2 from exceeding the capacity of the AC adapter 4.

When the monitored state-of-charge exceeds a specific value, the controller 11 receives power from the smart device 2 through the power circuit 14.

As a result, because power can be supplied from the smart device 2 to the printer 1, the printer 1 can operate based on power received from the smart device 2. More particularly, when the printer 1 is a mobile printer, the printer 1 can execute operations, such as charging the battery of the printer 1, using power supplied from the smart device 2.

The controller 11 also monitors how long the smart device 2 is connected to the USB interface 15. If the monitored time exceeds three days (a specific time), the controller 11 controls the power supply by the power circuit 14 so that the state-of-charge goes to a range (specific range) from 80% to 30%.

As a result, because the supply of power is controlled so that the state-of-charge goes to a range from 80% to 30% when the monitored connection period exceeds three days, the controller 11 can supply power to the smart device 2 without applying a load to the battery 21 of the smart device 2.

The power circuit 14 also supplies power for charging the battery 21 of the smart device 2.

As a result, because the controller 11 supplies charging power to the smart device 2, the controller 11 can supply the power required for the printing operation while also charging the battery 21 of the smart device 2.

The invention is described above with reference to a preferred embodiment thereof, but the invention is not limited thereto and can be modified and adapted in many ways without departing from the scope of the accompanying claims.

For example, the thermal line head 161 in the foregoing embodiment has 24 resistors 162, but the number of resistors 162 is not limited to 24. The arrangement of the multiple resistors 162 of the thermal line head 161 is also not limited to the configuration (rows of two resistors 162 in the conveyance direction Y, and 12 resistors 162 in the perpendicular direction Z) described above.

For example, the foregoing embodiment describes supplying power to the smart device 2 in a continuous connection supply mode when the time the smart device 2 has been connected is three days or longer. However, the time for starting the continuous connection supply mode is not limited to three days.

The foregoing embodiment also describes controlling the supply of power so that the state-of-charge of the battery 21 is in the range of 80% to 30%, but the invention is not limited to this range. To prevent overcharging, the upper limit of the range is preferably less than 100%, and the lower limit of the range is preferably a state-of-charge enabling the device to operate after the device is disconnected.

The foregoing embodiment also describes a configuration in which the printer 1 receives power from the smart device 2 when the state-of-charge of the smart device 2 is 90% or greater, but the state-of-charge in which power can be received is not limited to 90%.

When the control method of the printer 1 described above (control method of a printing device) is executed by a computer of the printer 1, the invention can also be embodied by a program executed by a computer to implement the foregoing control method, a recording medium recording the program readably by the computer, or a communication medium able to transfer the program.

The recording medium may also be a magnetic or optical recording medium, or a semiconductor memory device, for example. More specifically, the recording medium may be a floppy disk, HDD (Hard Disk Drive), CD-ROM (Compact Disk Read Only Memory), DVD (Digital Versatile Disk), Blu-ray® Disc, magneto-optical disc, flash memory device, card media, or other type of removable or fixed recording medium. The recording medium may also be an internal storage device of the printer 1, such as RAM (random access memory), ROM (read-only memory), hard disk drive, or other nonvolatile storage device.

The processing units shown in the flow chart in FIG. 2 are also used to facilitate understanding the process of the printer 1, are divided according to the main content of the process, and the invention is not limited by the method of dividing and naming the process units. The process of the printer 1 may be further divided into more steps according to the process content. Individual steps may also be further divided into more steps.

The function units shown in FIG. 1 illustrate desirable functional configurations, and the specific configuration of the invention is not limited thereto. More specifically, hardware components corresponding individually to each function unit are not necessarily required, and configurations in which a single processor embodies the functions of multiple function units by executing a specific program or programs are obviously conceivable. Some functions embodied by software in the foregoing embodiments may instead be embodied by hardware, and some functions embodied by hardware in the foregoing embodiments may instead be embodied by software. The specific detailed configurations of the printer 1 and other parts can also be varied as desired without departing from the scope of the invention.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device comprising:
a power supply unit;
an interface capable of supplying power from the power supply unit to an external device while communicating by wire with the external device;
a print unit configured to print; and
a controller configured to control the print unit to print in a power conservation mode when information instructing printing by the print unit is received by the interface from the external device while supplying power from the power supply unit to the external device.

2. The printing device described in claim 1, wherein:
the print unit includes a printhead with multiple resistors; and the controller, in the power conservation mode, segments the plural resistors of the printhead into plural blocks, and prints by energizing the resistors in the segmented blocks one block at a time.

3. The printing device described in claim 2, wherein:
the controller monitors the state-of-charge of a battery in the external device, and controls the number of segmented blocks according to the detected state-of-charge.

4. The printing device described in claim 3, wherein:
the controller, when the state-of-charge is below a specific value, increases the number of blocks created so that the state-of-charge goes above a specific value.

5. The printing device described in claim 3, wherein:
when the detected state-of-charge exceeds a specific value, the controller receives power supplied from the external device by the power supply unit.

6. The printing device described in claim 3, wherein:
the controller monitors the time the external device is connected to the interface, and
when the time connected exceeds a specific value, supplies power by the power supply unit so that the state-of-charge is within a specific range.

7. The printing device described in claim 1, wherein:
the power supply unit supplies power for charging a battery of the external device.

8. A control method of a printing device having a power supply unit, an interface capable of supplying power from the power supply unit to an external device while communicating by wire with the external device, and a print unit configured to print, the control method comprising:
controlling the print unit to print in a power conservation mode when information instructing printing by the print unit is received by the interface from the external device while supplying power from the power supply unit to the external device.

9. The control method of a printing device described in claim 8, wherein:
the print unit includes a printhead with multiple resistors;
the control method including, in the power conservation mode, segmenting the plural resistors of the printhead into plural blocks, and printing by energizing the resistors in the segmented blocks one block at a time.

10. The control method of a printing device described in claim 9, further comprising:
monitoring the state-of-charge of a battery in the external device, and controlling the number of segmented blocks according to the detected state-of-charge.

11. The control method of a printing device described in claim 10, further comprising:
when the state-of-charge is below a specific value, increasing the number of blocks created so that the state-of-charge goes above a specific value.

12. The control method of a printing device described in claim 10, further comprising:
when the detected state-of-charge exceeds a specific value, receiving power supplied from the external device by the power supply unit.

13. The control method of a printing device described in claim 10, further comprising:
monitoring the time the external device is connected to the interface; and
when the time connected exceeds a specific value, supplies power by the power supply unit so that the state-of-charge is within a specific range.

14. The control method of a printing device described in claim 8, further comprising:
the power supply unit supplying power for charging a battery of the external device.

* * * * *